United States Patent [19]
O'Banion

[11] 4,091,959
[45] May 30, 1978

[54] GAS CAP

[76] Inventor: John D. O'Banion, No. 7 Country Pl., Arlington, Tex. 76010

[21] Appl. No.: 765,452

[22] Filed: Feb. 3, 1977

[51] Int. Cl.² .................. B65D 41/04; B65D 43/16; B65D 51/04

[52] U.S. Cl. .................................. 220/304; 220/86 R; 220/344

[58] Field of Search ............ 220/86 R, 344, 303, 220/304; 141/348, 349

[56] References Cited

U.S. PATENT DOCUMENTS

| | | | |
|---|---|---|---|
| 1,982,879 | 12/1934 | Overbury | 220/86 R |
| 2,247,509 | 7/1941 | Lebus | 220/86 R |
| 2,414,909 | 1/1947 | Snyder | 220/86 R |
| 2,551,058 | 5/1951 | Selzler | 220/86 R |
| 2,593,712 | 4/1952 | Wells et al. | 220/86 R |
| 2,657,824 | 11/1953 | Mariani | 220/86 R |
| 2,695,161 | 11/1954 | Lebus | 220/86 R |
| 2,835,269 | 5/1958 | Seymour | 220/344 |
| 3,478,922 | 11/1969 | Mole | 220/86 R |
| 3,897,810 | 8/1975 | Arnett et al. | 141/349 |
| 3,911,977 | 10/1975 | Berger | 220/86 R |
| 3,937,358 | 2/1976 | Smith et al. | 220/303 |

FOREIGN PATENT DOCUMENTS

| | | | |
|---|---|---|---|
| 999,247 | 11/1976 | Canada | 220/86 R |
| 1,247,958 | 8/1967 | Germany | 220/86 R |

*Primary Examiner*—William Price
*Assistant Examiner*—Allan N. Shoap
*Attorney, Agent, or Firm*—Gerald G. Crutsinger; Larry B. Dwight

[57] ABSTRACT

A cap for a vehicle gas tank, the cap having an opening formed therein closed by a door having a smooth, continuous convex upper surface which is hingedly secured to an annular support body. The door is spring-urged into sealing engagement with a gasket and is adapted to permit passage of a gasoline nozzle through the opening to move the door out of the path of the nozzle. The sidewall of the nozzle engages the convex upper surface of the door such that the periphery of the door is maintained in spaced relation from the wall of the nozzle to permit withdrawal of the nozzle from the opening. The door is spring-urged into sealing engagement with the gasket with sufficient force to maintain a seal when a partial vacuum is formed in the tank.

6 Claims, 2 Drawing Figures

GAS CAP

BACKGROUND

As a result of fuel shortage, inflation of gasoline prices and high labor cost, self-service gasoline stations from which gasoline is purchased at a reduced rate have become popular. However, for various reasons, ladies and business men have not utilized self-service gasoline pumps to a maximum extent.

The cap on gasoline tanks are often covered with dirt and grease which results in a strong likelihood that the consumer will soil his hands and possibly his clothes when the cap is removed and replaced.

In view of emission control standards established to protect the environment, vehicle designers have developed systems to prevent leakage of fuel and paper from the gas tank. Improper connection of a gas cap to a vehicle gas tank presents a potential fire hazard and also permits leakage of vapor from the tank of the vehicle.

In addition to numerous problems encountered by unskilled persons removing and replacing a gas cap, service station attendants occasionally forget to replace the cap or replace the cap improperly resulting in loss of the gas cap.

U.S. Pat. No. 1,810,019; U.S. Pat. No. 1,818,608; U.S. Pat. No. 2,503,031; and U.S. Pat. No. 2,765,948 disclose self-closing caps for fuel tanks, radiators and the like.

Self-closing caps heretofore devised are not suitable for replacement of conventional gas caps, radiator caps and the like on modern vehicles without substantial modification of the neck of the tank. Self-closing caps heretofore devised have not offered sealing capability required to meet existing emission control regulations and to permit use of the cap or filling the tank without removal of the cap or alternatively to permit removal of the cap if it is deemed expedient to do so without the use of tools.

SUMMARY

A have devised a self-closing gasoline cap readily adaptable to replace the factory equipped cap on today's automobile without modifying the filler tube of the vehicle. The cap has a door which is spring-urged upwardly into sealing relationship with a gasket in the upper surface of the cap such that when the door is closed the inlet to the gas tank is sealed off to prevent escape of vapors therefrom.

The door is pivotally secured to one side of the bore of a hollow cylindrical body. The door has convex, smooth, continuous upper surface which engages the gasket to seal evenly thereabout every time the door closes regardless of the positioning of the door. A spring urges the door upwardly with sufficient force to prevent the door from opening when a partial vacuum is drawn within the tank caused by pollution control equipment used on some vehicles.

The door is adapted to be urged downwardly and to the side of the opening by the gas nozzle as the nozzle is inserted through the opening in the cap. The cap readily allows the nozzle to be aligned with the secondary opening on unleaded tanks for easy insertion of the nozzle into the filler tube. The rounded convex, upper surface of the door has no shoulders or edges with which to engage the nozzle which would bind when withdrawing the nozzle from the gasoline filler tube.

A primary object of the invention is to provide a self-closing gas cap which seals off the tank to prevent escape of gasoline vapors from the gas tank and which is readily adaptable to be used on all models of automobiles presently in use today which use unleaded and regular gas without modifying the filler tube on the vehicle.

A further object of the invention is to provide a self-closing gas cap which complies with governmental requirements and which will allow persons using self-service gas pumps to fill their tanks without removing the gas cap therefore reducing the possibility of soiling their hands and clothes.

A still further object of the invention is to provide a gas cap having a spring-urged door which is particularly adapted to allow insertion of the gas pump nozzle into the tank, thereby opening the door and to allow withdrawal of the nozzle from the tank without binding on the edges of the door which would deform the door and possibly destroy the effectiveness of the seal of the cap.

A still further object of the invention is to provide a self-closing gas cap which would allow insertion of the nozzle into the neck of the gas tank without removing the cap and which would minimize waste caused by sloshing of the gasoline as the tank is being filled.

A still further object of the invention is to provide a cap which is detachably secured to the neck of the gas tank which would allow it to be removed but would eliminate the necessity of removal and replacement of the cap on the tank each time the tank is filled which would minimize improper placement of a gas cap on the neck thereby minimizing the leakage of vapors, emissions and other types of pollution into the environment.

Other and further objects of the invention will become apparent upon studying the detailed description hereinafter following and the drawings annexed hereto.

DESCRIPTION OF THE DRAWING

Drawings of a preferred embodiment of the invention are annexed hereto so that the invention may be further and more fully understood, in which.

Numeral references are used to designate like parts throughout the various figures of the drawing.

DESCRIPTION OF A PREFERRED EMBODIMENT

Figures 1, 2:
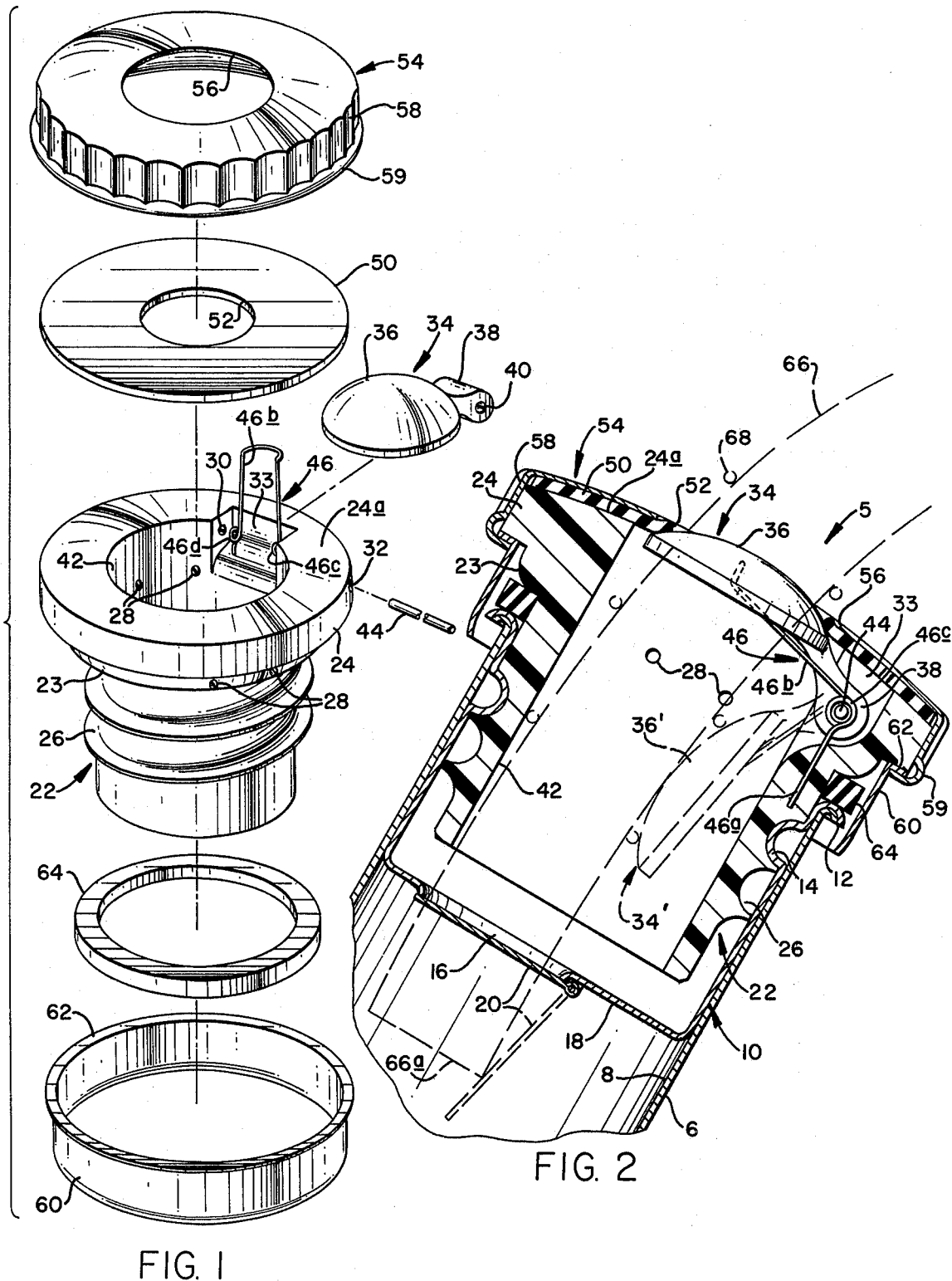
FIG. 1 is an exploded perspective view with parts broken away to more clearly illustrate the details of construction.
FIG. 2 is a cross-sectional view of the cap inserted in the filler tube of a tank.

As best illustrated in FIG. 2, the numeral 5 generally designates the gas cap which is threadedly secured to the upper open end of filler tube 6 of the typical gas tank (not shown).

Filler tube 6 comprises a cylindrical hollow tube having a bore 8 which extends outwardly from the gas tank (not shown). Filler tube 6 and cup 10 are of conventional design presently used on vehicles today.

A cylindrical shaped cup 10 having an outwardly deflected upper edge 12 is rigidly secured in the upper end of a filler tube 6. An inwardly extending rounded shoulder 14 forms a female thread on the sidewall of cup 10. In order to meet present day regulations on automobiles having an unleaded fuel requirement, manufacturers have formed a secondary opening 16 in the bottom 18 of cup 10. A door 20 is pivotally secured and spring-urged upwardly to cover opening 16. Opening 16 has a diameter slightly larger than the diameter of nozzle 66, shown in dashed outline, which dispenses unleaded gas. The size of nozzle 66 is determined by federal regulations to prevent leaded gas nozzles from being inserted into the filler tube 6. Cap 5 is adapted to be secured to the filler tube 6 without modifying the vehicle.

As best illustrated in FIG. 1, the gas cap 5 comprises a cylindrical shaped body 22 having a flange 24 formed on one end forming a shoulder 23 and having a passage formed longitudinally therethrough. Means to secure the body 22 in bore 8 of filler tube 6 and cup 10 comprises a helically formed groove 26 which forms male threads to engage rounded shoulder 14 formed in cup 10. The lower portion of body 22, illustrated in the drawings, is adapted to fit vehicles manufactured by General Motor Corporation; however, it should be readily apparent that only slight modifications are needed to fit other vehicle gas tank filler tube 6. One such modification would be downwardly depending lugs (not shown) which engage a slot formed in the upper portion of the neck (not shown) as manufactured by Ford Motor Company and others.

Standard venting means comprises small apertures 28 formed adjacent the lower portion of flange 24 which communicate with the interior portion of the gas tank to relieve vacuum pressures developed by pollution control devices. Aligned apertures 30 and 32 are formed through flange 24. A recess 33 is formed inwardly from bore 42 of body 22 between apertures 30 and 32 to receive lug 38 and door 34.

Door 34 has a continuous, smooth, convex upper surface 36 and an outwardly extending lug 38 having an aperture 40 formed laterally therethrough. Door 34 is disc shaped to allow passage of the tubular nozzle 66 into tube 6. Aperture 40 in lug 38 on door 34 is aligned with apertures 30 and 32 and a pin 44 is journalled through apertures 30, 40 and 32 to form the pivot point of door 34. Door 34 is spring-urged upwardly by spring 46 comprising a downwardly depending portion 46a which is molded or secured within a slot formed in cylindrical body 22 adjacent recess 33 and has an outwardly deflected portion 46b which engages the lower surface of cap 34 to urge same upwardly. Spring 46 is constructed of spring wire and has loops 46c and 46d formed centrally on each side such that pin 44 is journalled through the apertures formed by the loops 46c and 46d for securing spring 46 in body 22.

Means to seal the gas cap 5, such as a resilient rubber sealing gasket 50 having an aperture 52, is positioned between the upper surface 24a of flange 24 and lid 54. Gasket 50 limits upwardly movement of door 34 to prevent the door 34 from moving through passage 56 in lid 54. Lid 54 has an aperture 56 formed therein slightly smaller than the diameter of door 34 but larger than aperture 52 in gasket 50. Lid 54 has a downwardly deflected edge 58 which is positioned over flange 24. A dust ring 60 having an outwardly deflected edge 62 is secured under flange 24 of body 22. An outwardly deflected edge 62 engages inwardly deflected edge 59 of lid 54 to secure the dust ring 60 to lid 54. Dust ring 60 limits movement of pin 44 to prevent the pin 44 from being dislodged from the body 22.

A resilient O-ring 64 is positioned about body 22 adjacent shoulder 23 to seal against lip 12 of tube 6. O-ring 64 is slightly flattened to sealingly contact the deflected edge 12 of the upper end of filler tube 6. As best illustrated in FIG. 2, aperture 56 is aligned with aperture 52 which is aligned with door 34 to allow insertion of the gas nozzle 66, shown in dashed outline, into the bore 42 of the gas cap 5 and through opening 16 in the bottom 18 of cap 10. Spring 68 is wound about the cylindrical shaped gas nozzle 66 to prevent the nozzle 66 from falling out of the filler tube 6. The end 66a of nozzle 66 deflects door 20 from a position across the end of bore 42 in body 22 to a position substantially aligned with the sidewalls of bore 42 to allow passage of nozzle 66 through bore 42, as shown in dashed outline in FIG. 2. It should be apparent that there are no edges on door 34 to engage nozzle 66 and only the upper portion of the convex upper surface 36 engages the side of nozzle 66. When nozzle 66 is withdrawn from tube 6, door 34 does not have any sharp edges with which to engage the side of nozzle 66 or spring 68 to cause binding of the door 34 which would deform door 34 which would prevent proper sealing. The upper surface 36 of the door 34 engages the peripheral edges of opening 52 in gasket 50 and urges them upwardly against the peripheral edges of O-ring 56 formed in lid 54. Since door 34 engages the lower edges and surface of gasket 50, a seal is formed between gasket 50 and door 34 no matter how door 34 returns. This means a seal is formed even if door 34 has returned off-center due to wear since the dome shaped disc engages the lower surface of gasket 50 and does not pass through it.

It should be readily apparent that the door 34 is urged upwardly against gasket 50 by spring 46 such that only a shallow cavity is formed by the passage 56 in lid 54 thereby preventing water and dust from collecting therein which would likely fall into the gas tank filler tube 6 upon opening door 34 which would contaminate the fuel possible harming the vehicle's engine.

Gas cap 5 is adapted to be positioned on the filler tube 6 in a manner similar to that of the manufacturers cap such that cap 5 will not have to be removed except under extra ordinary circumstances.

The nozzle 66 is positioned against the upper dome surface 36 of door 34 and pushed inwardly deflecting the door 34 to the position shown in dashed outline 34'. Nozzle 66 engages the secondary door 20 and deflects same open. Gasoline is pumped into the tank. The nozzle 66 may be withdrawn without binding on door 34. Door 34 moves upwardly to seal against gasket 50 and peripheral edges of passages 52 and 56 in lid 54. This prevents moisture from coming in and vapors or other emissions from escaping the tank.

It should be readily apparent that the strength of spring 56 should be sufficient to urge the door 34 upwardly even though a partial vacuum may be formed in filler tube 6. Pollution control systems used on vehicles often form a vacuum within the tank and spring 46 must be sufficiently strong to overcome the force equal to the area and the surface 36 of door 34 times the differential pressure between the inside and outside of the filler tube 6. Vent holes 28 are normally supplied to provide for a slow equalization of pressure.

It should be further appreciated that body 22 may be modified to be adaptable to any type of filler tube 6 used on various types of vehicles. It should also be appreciated that cap 5 may be used with all types of fuel.

Having described my invention, I claim:

1. A self closing gas cap removeably secured to a gas filler tube comprising: a cylindrical shaped body having a central passage formed therethrough; a door having a smooth, convex, continuous upper surface; means pivotally securing said door to said body adjacent said passage such that said door is moveable from a first position across the upper end of said central passage to a second position substantially aligned with the wall of said central passage; spring means secured to said body and to said door to urge said door upwardly; a resilient sealing gasket positioned over one end of said body and said door, said gasket having a passage formed centrally therein such that the inner edge of said passage in the gasket engages the upper surface of the door to form a seal therewith and limit upward movement of the door, a portion of the convex upper surface of said door extending through the passage in the gasket; cap means having a passage formed centrally therethrough and aligned with the passage in the gasket, said passage through the gasket being smaller than the passage through the cap such that the convex upper surface on said door deflects said gasket into the opening through said cap; means securing said cap means above the gasket and door to secure the gasket to the body to aid the gasket in limiting upward movement of the door.

2. The combination called for in claim 1 wherein the means pivotally securing said door comprises: a lug secured to the door, said lug having an aperture formed therethrough; and a pin journalled through said body and the aperture in the lug.

3. The combination called for in claim 2 wherein the means to urge said door upwardly comprises: a wire spring, opposite ends of said spring being spirally twisted about said pin adjacent opposite sides of said lug and secured in the upper portion of said body, the central portion of said spring being positioned to engage the lower surface of the door.

4. The combination called for in claim 1 wherein the cylindrical shaped body has threads formed on the exterior portion thereof for securing the cap to the filler tube.

5. The combination called for in claim 1 with the addition of: a dust ring secured about the upper portion of the body and secured to said cap means; and a resilient seal ring secured between the dust ring and body, said seal ring adapted to seal against the upper surface of the filler neck.

6. A self closing gas cap removeably secured to a gas filler tube comprising: a cap cover having a passage formed centrally therethrough, said cover having deflected edges formed about the periphery thereof; a gasket having a passage formed centrally therethrough said passage having a diameter smaller than the diameter of the passage formed in said cap cover, said gasket being secured adjacent said cap cover such that the passages are aligned; a door having a convex, upper surface; a cylindrical shaped body having a bore formed centrally therethrough, said body having an upper first shoulder formed about the periphery of one end and a second shoulder formed immediately adjacent said first shoulder, vent passages formed through said second shoulder communicating with the upper end of said bore in said cylindrical body; a ring shaped gasket engaging said second shoulder in position to engage the upper surface of the filler tube whenever the cap is secured to the filler tube; a dust ring having a deflected edge to engage the deflected edge of the cap cover, said dust ring being secured about the first shoulder on said cylindrical body to form a passage communicating downwardly from the second shoulder; a lug formed on said door having an aperture formed therethrough; a pin passing through said body and said aperture in said lug; a wire spring having opposite ends spirally twisted about said pin adjacent opposite sides of said lug and secured to the upper portion of said body, a central portion of said spring being positioned to engage the lower surface of said door to urge said door upwardly through the passage formed in said gasket and deflecting said gasket upwardly through the passage formed in said cap cover to form a substantially smooth surface across said cover.

* * * * *